(12) United States Patent
Inagaki et al.

(10) Patent No.: US 12,188,951 B2
(45) Date of Patent: Jan. 7, 2025

(54) SPECIMEN MEASUREMENT APPARATUS AND METHOD PERFORMED IN SPECIMEN MEASUREMENT APPARATUS

(71) Applicant: SYSMEX CORPORATION, Kobe (JP)

(72) Inventors: Jun Inagaki, Kobe (JP); Yoshinori Nakamura, Kobe (JP); Kohei Oda, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 591 days.

(21) Appl. No.: 16/574,653

(22) Filed: Sep. 18, 2019

(65) Prior Publication Data

US 2020/0103425 A1 Apr. 2, 2020

(30) Foreign Application Priority Data

Sep. 28, 2018 (JP) .................. 2018-184790

(51) Int. Cl.
*G01N 35/00* (2006.01)
*G01N 35/02* (2006.01)
*G01N 35/04* (2006.01)

(52) U.S. Cl.
CPC ..... *G01N 35/00584* (2013.01); *G01N 35/025* (2013.01); *G01N 35/04* (2013.01); *G01N 35/026* (2013.01); *G01N 2035/0403* (2013.01); *G01N 2035/0406* (2013.01);
(Continued)

(58) Field of Classification Search
CPC ............ G01N 35/00584; G01N 35/025; G01N 35/04; G01N 35/026; G01N 2035/0403; G01N 2035/0406; G01N 2035/0439; G01N 2035/0441; G01N 2035/0491
See application file for complete search history.

(56) References Cited

U.S. PATENT DOCUMENTS

2011/0076199 A1* 3/2011 Meller .................. G01N 21/255
356/440
2012/0045366 A1* 2/2012 Katsumi ............ G01N 35/1011
422/67

(Continued)

FOREIGN PATENT DOCUMENTS

CN 1570650 A 1/2005
CN 102384982 A 3/2012
(Continued)

OTHER PUBLICATIONS

The Japanese Office Action issued on Jan. 28, 2020 in a counterpart Japanese patent application No. 2018-184790.
(Continued)

*Primary Examiner* — P. Kathryn Wright
(74) *Attorney, Agent, or Firm* — Crowell & Moring LLP

(57) ABSTRACT

Disclosed is a specimen measurement apparatus that includes a measurement unit configured to measure a specimen; a detector configured to detect at least one of a container that can store the specimen or a cap of the container; and a movement mechanism configured to move at least one of the container or the detector. In the specimen measurement apparatus, the detector detects at least one of the container and the cap in a state where the movement mechanism is moving the container relative to the detector.

16 Claims, 10 Drawing Sheets

(52) U.S. Cl.
CPC .............. *G01N 2035/0439* (2013.01); *G01N 2035/0441* (2013.01); *G01N 2035/0491* (2013.01)

(56) References Cited

U.S. PATENT DOCUMENTS

| | | | | |
|---|---|---|---|---|
| 2012/0251391 | A1* | 10/2012 | Hagiwara | G01N 35/00722 422/68.1 |
| 2013/0034466 | A1* | 2/2013 | Wakamiya | G01N 35/0092 422/63 |
| 2013/0125628 | A1* | 5/2013 | Kitagawa | G01N 33/49 73/61.41 |
| 2014/0295562 | A1 | 10/2014 | Wakamiya et al. | |
| 2014/0314623 | A1 | 10/2014 | Yamagata et al. | |
| 2015/0323475 | A1* | 11/2015 | Kullenberg | G01N 23/10 378/53 |
| 2016/0313359 | A1* | 10/2016 | Steinebach | G01N 35/00732 |
| 2018/0080948 | A1* | 3/2018 | Yabutani | G01N 35/00722 |
| 2019/0234979 | A1* | 8/2019 | Wright | G01N 35/10 |
| 2020/0372287 | A1* | 11/2020 | Sawhney | G06T 7/62 |

FOREIGN PATENT DOCUMENTS

| | | | |
|---|---|---|---|
| CN | 102713638 A | 10/2012 | |
| CN | 103339513 A | 10/2013 | |
| CN | 103597338 A | 2/2014 | |
| CN | 103675309 A | 3/2014 | |
| CN | 104515865 A | 4/2015 | |
| EP | 2187220 A2 | 5/2010 | |
| JP | H7-280814 A | 10/1995 | |
| JP | H08-94768 A | 4/1996 | |
| JP | H09-178757 A | 7/1997 | |
| JP | 2000-46841 A | 2/2000 | |
| JP | 2001-194371 A | 7/2001 | |
| JP | 3420842 B2 | 6/2003 | |
| JP | 2007-085967 A | 4/2007 | |
| JP | 2009-162720 A | 7/2009 | |
| JP | 2010-156649 A | 7/2010 | |
| JP | 2012-251829 A | 12/2012 | |
| JP | 2014-32096 A | 2/2014 | |
| WO | WO-2017152285 A1 * | 9/2017 | ............. G01N 33/49 |

OTHER PUBLICATIONS

The extended European search report issued on Mar. 3, 2020 in a counterpart European patent application No. 19199507.5.

The Communication pursuant to Article 94(3) EPC issued on Apr. 15, 2021 in a counterpart European patent application No. 19199507.5.

The Japanese Office Action issued on Jan. 12, 2021 in a counterpart Japanese patent application No. 2018-184790.

The Japanese Office Action issued on Oct. 20, 2020 in a counterpart Japanese patent application No. 2018-184790.

The Japanese Office Action issued on Jun. 2, 2020 in a counterpart Japanese patent application No. 2018-184790.

The Communication pursuant to Article 94(3) EPC issued on Sep. 19, 2022 in a counterpart European patent application No. 19199507.5.

Chinese Office Action with English Translation, dated Jun. 30, 2023, pp. 1-27, issued in Chinese patent application No. 201910927532.2, China National Intellectual Property Administration, Beijing, China.

The Communication pursuant to Article 94(3) EPC issued on Dec. 14, 2023 in a counterpart European patent application No. 19199507.5.

The Chinese Office Action issued on Mar. 7, 2024 in a counterpart Chinese patent application No. 1 201910927532.2.

The Rejection Decision issued on Jun. 22, 2024 in a counterpart Chinese patent application No. 1 201910927532.2 (24 pages).

* cited by examiner

ANALYZER

SPECIMEN MEASUREMENT APPARATUS AND METHOD PERFORMED IN SPECIMEN MEASUREMENT APPARATUS

RELATED APPLICATIONS

This application claims priority from prior Japanese Patent Application No. 2018-184790, filed on Sep. 28, 2018, entitled "Specimen Measurement Apparatus and Specimen Measurement Method", the entire content of which is incorporated herein by reference.

BACKGROUND OF THE INVENTION

1. Field of the Invention

The present invention relates to a specimen measurement apparatus and a method performed in the specimen measurement apparatus.

2. Description of the Related Art

To date, a specimen measurement apparatus has been known (see, for example, Japanese Laid-Open Patent Publication No. 2007-085967). Japanese Laid-Open Patent Publication No. 2007-085967 discloses a specimen processing system 900 (specimen measurement apparatus) that includes, as shown in FIG. 13, a measurement unit 901 for measuring a specimen, a detector 904 for detecting presence or absence of a seal 903 of a container 902 for storing a specimen, and a transport mechanism 906 for moving the container 902 while being stored in a rack 905. In the specimen processing system 900 disclosed in Japanese Laid-Open Patent Publication No. 2007-085967, when the detector 904 detects presence or absence of the seal 903 of the container 902, transporting by the transport mechanism 906 is temporarily stopped, and the container 902 is moved upward from the rack 905. Thus, the detector 904 performs the detection.

However, in the specimen processing system 900 disclosed in Japanese Laid-Open Patent Publication No. 2007-085967, when the detector 904 detects presence or absence of the seal 903 of the container 902, transporting by the transport mechanism 906 is temporarily stopped, the container 902 is moved upward from the rack 905, and the detector 904 then performs the detection. Therefore, a period of time during which detection for presence or absence of the seal 903 of the container 902 is performed is disadvantageously elongated. In a conventional specimen measurement apparatus, an operation rate for the entirety of the apparatus is restricted by the measurement of a specimen by the measurement unit. Therefore, a specimen need not be quickly supplied to the measurement unit. That is, since a sequence time for measuring a specimen by the measurement unit is long, a time in which a state of the container is detected need not be shortened. However, in the specimen processing system disclosed in Japanese Laid-Open Patent Publication No. 2007-085967, in a case where the sequence time for measuring a specimen by the measurement unit is shortened, a problem may arise that detection of a state of the container, such as detection for presence or absence of the seal of the container, restricts an operation rate to inhibit a measurement time from being shortened.

SUMMARY OF THE INVENTION

The scope of the present invention is defined solely by the appended claims, and is not affected to any degree by the statements within this summary.

A specimen measurement apparatus (100) according to a first aspect of the present invention includes: a measurement unit (10) configured to measure a specimen; a detector (20, 21, 22, 23) configured to detect at least one of a container (40, 42) that can store the specimen or a cap (41) of the container (40); and a movement mechanism (30) configured to move at least one of the container (40, 42) and the detector (20, 21, 22, 23). The detector (20, 21, 22, 23) detects at least one of the container (40, 42) or the cap (41) in a state where the movement mechanism (30) is moving the container relative to the detector.

The specimen measurement apparatus (100) according to the first aspect has the above-described configuration. Therefore, when the container (40, 42) is detected, movement of the container (40, 42) relative to the detector (20, 21, 22, 23) need not be temporarily stopped. Accordingly, a period of time during which at least one of presence or absence of the container (40, 42) and presence or absence of the cap (41) of the container (40) is detected can be shortened as compared with a case where relative movement of the container (40, 42) is temporarily stopped to perform the detection. This can prevent an operation of detecting a state of the container (40, 42) from interfering with shortening of a specimen measurement time.

In the specimen measurement apparatus (100) according to the first aspect, the detector (20, 21, 22, 23) preferably detects at least one of the container (40, 42) or the cap (41), based on a moving distance or a movement position by the movement mechanism (30). In this configuration, the detector (20, 21, 22, 23) can perform the detection at timing when the container (40, 42) is at a position at which the detector (20, 21, 22, 23) can detect the container (40, 42). Therefore, at least one of the container (40, 42) or the cap (41) of the container (40) can be easily detected without temporarily stopping relative movement of the container (40, 42).

In this case, the movement mechanism (30) preferably includes a motor (30*a*) and an encoder (30*b*), and the detector (20, 21, 22, 23) preferably detects at least one of the container (40, 42) or the cap (41), based on an output from the encoder (30*b*). In this configuration, a moving distance or a movement position by the movement mechanism (30) can be easily obtained.

In the specimen measurement apparatus (100) according to the first aspect, the movement mechanism (30) preferably moves the container (40, 42) to the detector (20, 21, 22, 23) when the detector (20, 21, 22, 23) performs detection. In this configuration, detection of at least one of the container (40, 42) or the cap (41) can be performed without temporarily stopping the container (40, 42) relative to the detector (20, 21, 22, 23).

In this case, a reference position at which a relative position of the container (40, 42) relative to the detector (20, 21, 22, 23) is known is preferably set in a section in which the container (40, 42) is moved, and the movement mechanism (30) preferably moves the container (40, 42) from the reference position that is set as a start point. In this configuration, the detector (20, 21, 22, 23) performs the detection at timing when the container (40, 42) has been moved over a predetermined distance from the reference position to the position at which the detector (20, 21, 22, 23) performs the detection, whereby detection of the container (40, 42) can be assuredly performed while the container (40, 42) is being moved.

In the specimen measurement apparatus (100) according to the first aspect, the movement mechanism (30) preferably moves the detector (20, 21, 22, 23) to the container (40, 42) when the detector (20, 21, 22, 23) performs detection. In this configuration, detection of at least one of the container (40, 42) or the cap (41) can be performed without temporarily stopping the detector (20, 21, 22, 23) relative to the container (40, 42).

In this case, an initial position of the detector (20, 21, 22, 23) is preferably set, and the movement mechanism (30) preferably moves the detector (20, 21, 22, 23) from the initial position that is set as a start point. In this configuration, the detector (20, 21, 22, 23) performs the detection at timing when the detector (20, 21, 22, 23) has been moved over a predetermined distance from the initial position to the position of the container (40, 42), whereby the container (40, 42) can be assuredly detected also while the detector (20, 21, 22, 23) is being moved.

In the specimen measurement apparatus (100) according to the first aspect, preferably, the movement mechanism linearly transports a specimen rack (105) storing a plurality of containers, and the detector detects at least one of each container stored in the specimen rack or the cap of each container in a state where the movement mechanism is moving the specimen rack relative to the detector. In this configuration, the detector (20, 21, 22, 23) can perform the detection while a plurality of the containers (40, 42) are linearly moved in a state of being stored in the specimen rack (105). Therefore, detection can be performed while the plurality of the containers (40, 42) are moved. Thus, the detection time can be effectively shortened as compared with a case where each of the plurality of the containers (40, 42) is temporarily stopped to perform the detection.

In the specimen measurement apparatus (100) according to the first aspect, the movement mechanism (30) preferably includes a rotatable table (32, 33), and transports the container (40, 42) disposed in the rotatable table (32, 33) by rotating the rotatable table (32, 33). In this configuration, the container (40, 42) disposed in the rotatable table (32, 33) can be detected without temporarily stopping rotation of the rotatable table (32, 33).

In the specimen measurement apparatus (100) according to the first aspect, the movement mechanism transports a specimen rack storing a plurality of containers, and the detector detects the cap (41) of each container stored in the specimen rack in a state where the movement mechanism is moving the specimen rack relative to the detector. In this configuration, detection of the cap (41) of the container (40) can be performed without temporarily stopping relative movement of the specimen rack. Furthermore, the unsealing and change of the dispensing method can be performed for each container in the specimen rack based on the detection result of presence or absence of the cap (41).

In the specimen measurement apparatus (100) according to the first aspect, the movement mechanism comprises holders each configured to hold a container and transports the holders, and the detector detects disposition of at least one container held by at least one of the holders. In this configuration, an operation for measurement can be performed only at a position where the container (40, 42) is present without performing the operation at a position where the container (40, 42) is absent, based on presence or absence of the container (40, 42) in each holder. Thus, shortening of the measurement time can be effectively promoted.

The specimen measurement apparatus (100) according to the first aspect preferably includes a controller (50) programmed to control the movement mechanism (30). The controller (50) is preferably programmed to store a detection result from the detector (20, 21, 22, 23). In this configuration, the controller (50) can control the relative movement for detecting the container (40, 42) and store the detection result.

In this case, an information obtaining unit (61) configured to obtain information is preferably provided, and the information obtaining unit (61) preferably obtains information about at least one of presence or absence of the container (40, 42) or presence or absence of the cap (41) of the container (40), based on the detection result, from the detector (20, 21, 22, 23), which is stored in the controller (50). In this configuration, the controller (50), which causes the detection result to be stored, need not analyze the detection result. Therefore, increase of processing load for detection can be prevented.

The specimen measurement apparatus (100) according to the first aspect preferably includes a storage unit (52) configured to store information; and an information obtaining unit (61) configured to perform association of information. The detector (20, 21, 22, 23) preferably obtains first information about at least one of presence or absence of the container (40, 42) and presence or absence of the cap (41) of the container (40). The storage unit (52) preferably stores second information about at least one of time when the first information is obtained, and a position of the container (40, 42) relative to the detector (20, 21, 22, 23) at the time. The information obtaining unit (61) preferably associates, based on the second information, the first information with third information about at least one of identification of the container (40, 42) and a position of the container (40, 42) on the movement mechanism (30). In this configuration, after the detector (20, 21, 22, 23) has performed the detection, the information obtaining unit (61) can perform analysis so as to perform association of information. Therefore, increase of processing load for the detection can be inhibited.

A method according to a second aspect of the present invention is a method performed in a specimen measurement apparatus. The method includes: moving a container that can store a specimen relative to a detector; detecting, by the detector, at least one of a container (40, 42) that can store a specimen or a cap (41) of the container (40) while moving the container (40, 42) relative to a detector (20, 21, 22, 23).

The method according to the second aspect is configured as described above. Therefore, when the container (40, 42) is detected, movement of the container (40, 42) relative to the detector (20, 21, 22, 23) need not be temporarily stopped. Accordingly, a period of time during which at least one of presence or absence of the container (40, 42) and presence or absence of the cap (41) of the container (40) is detected can be shortened as compared with a case where relative movement of the container (40, 42) is temporarily stopped to perform the detection. This can prevent an operation of detecting a state of the container (40, 42) from interfering with shortening of a specimen measurement time.

In the method according to the second aspect, detection for presence or absence of at least one of the container (40, 42) and the cap (41) is preferably performed based on a moving distance or a movement position by the movement mechanism (30). In this configuration, the detector (20, 21, 22, 23) can perform the detection at timing when the container (40, 42) is at a position at which the detector (20, 21, 22, 23) can detect the container (40, 42). Therefore, at least one of presence or absence of the container (40, 42) and presence or absence of the cap (41) of the container (40) can be easily detected without temporarily stopping relative movement of the container (40, 42).

In the method according to the second aspect, the movement mechanism (30) preferably moves the container (40,

42) relative to the detector (20, 21, 22, 23) when the detector (20, 21, 22, 23) performs detection. In this configuration, detection for presence or absence of at least one of the container (40, 42) and the cap (41) can be performed without temporarily stopping the container (40, 42) relative to the detector (20, 21, 22, 23).

In this case, a reference position at which a relative position of the container (40, 42) relative to the detector (20, 21, 22, 23) is known is preferably set in a section in which the container (40, 42) is moved, and the movement mechanism (30) preferably moves the container (40, 42) from the reference position that is set as a start point. In this configuration, the detector (20, 21, 22, 23) performs the detection at timing when the container (40, 42) has been moved over a predetermined distance from the reference position to the position at which the detector (20, 21, 22, 23) performs the detection, whereby detection of the container (40, 42) can be assuredly performed while the container (40, 42) is being moved.

In the method according to the second aspect, the movement mechanism (30) preferably moves the detector (20, 21, 22, 23) relative to the container (40, 42) when the detector (20, 21, 22, 23) performs detection. In this configuration, detection for presence or absence of at least one of the container (40, 42) and the cap (41) can be performed without temporarily stopping the detector (20, 21, 22, 23) relative to the container (40, 42).

In this case, an initial position of the detector (20, 21, 22, 23) is preferably set, and the movement mechanism (30) preferably moves the detector (20, 21, 22, 23) from the initial position that is set as a start point. In this configuration, the detector (20, 21, 22, 23) performs the detection at timing when the detector (20, 21, 22, 23) has been moved over a predetermined distance from the initial position to the position of the container (40, 42), whereby the container (40, 42) can be assuredly detected also while the detector (20, 21, 22, 23) is being moved.

In the method according to the second aspect, a detection result from the detector (20, 21, 22, 23) at a predetermined position is preferably stored while the movement mechanism (30) is moving the container (40, 42) relative to the detector (20, 21, 22, 23). In this configuration, the controller (50) can control the relative movement for detecting the container (40, 42), and store the detection result.

In this case, information about at least one of presence or absence of the container (40, 42) and presence or absence of the cap (41) of the container (40) is preferably obtained based on a stored detection result from the detector (20, 21, 22, 23). In this configuration, the controller (50), which causes the detection result to be stored, need not analyze the detection result of at least one of presence or absence of the container (40, 42) and presence or absence of the cap (41) of the container (40), and obtain the result as information. Therefore, increase of processing load for detection can be inhibited.

DETAILED DESCRIPTION OF THE PREFERRED EMBODIMENTS

Figure 1:
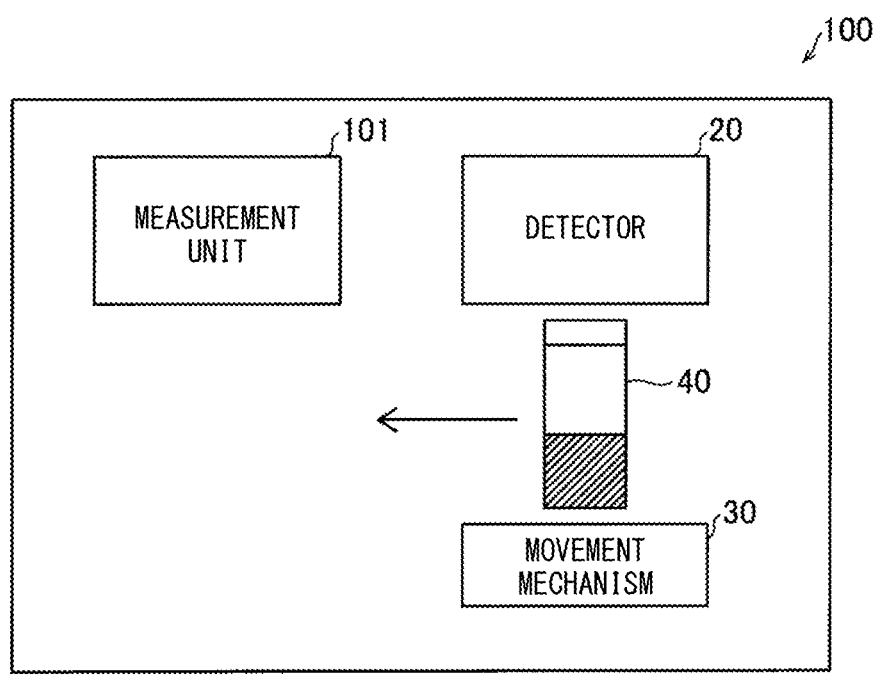
FIG. 1 is a block diagram schematically illustrating a specimen measurement apparatus.

An embodiment will be described below with reference to the drawings.
(Outline of Specimen Measurement Apparatus)
Firstly, the outline of a specimen measurement apparatus 100 according to one embodiment will be described with reference to FIG. 1.

The specimen measurement apparatus 100 measures a specimen that contains a target component.

The specimen includes a specimen which is derived from an organism and collected from a subject. The specimen contains a target component to be measured. The specimen may be a specimen itself, or a measurement sample prepared by adding a predetermined reagent to a specimen. The subject is mainly a human subject. However, the subject may be an animal other than a human subject. For example, the specimen measurement apparatus 100 measures a specimen collected from a patient, for a clinical laboratory test or medical research. The specimen derived from an organism is, for example, liquid such as blood (whole blood, serum, or plasma), urine, or another body fluid collected from the subject, or liquid obtained by subjecting the collected body fluid or blood to predetermined pretreatment. Furthermore, the specimen may be, for example, a part of tissue of the subject or a cell thereof other than liquid. The specimen measurement apparatus 100 detects a predetermined target component which is contained in the specimen. The target component may include, for example, a predetermined component in a blood or urine specimen, a cell, and a particle component. The target component may be nucleic acid such as DNA (deoxyribonucleic acid), a cell and an intracellular substance, an antigen or an antibody, protein, peptide, or the like.

The specimen measurement apparatus 100 includes a measurement unit 101 for measuring a specimen. The measurement unit 101 may be a measurement unit that functions as an independent analyzer such as a blood cell counter, a blood coagulation analyzer, an immunoassay apparatus, or a urine particle analyzer. The measurement unit 101 may be configured to perform necessary tasks for measuring a specimen in conjunction with another unit without functioning as an independent analyzer.

The measurement unit 101 is configured to measure a component contained in a specimen. Specifically, the measurement unit 101 measures a measurement sample in which a reagent in a reagent container is added to a specimen, to measure a component in the specimen. A method, performed by the measurement unit 101, for measuring a target component is not limited to a specific method, and a chemical method, an optical method, an electromagnetic method, or the like can be adopted according to a target component. For example, presence or absence of a target component, the number of the target components or an amount of the target component, a concentration or an abundance of the target component, and the like are analyzed based on the result of the measurement by the measurement unit 101.

The specimen measurement apparatus 100 includes a detector 20 for detecting at least one of disposition and a structure of a container 40 which can store a specimen. The detector 20 detects, for example, presence or absence of the container 40. Furthermore, the detector 20 detects disposition of the container 40. Moreover, the detector 20 detects, for example, presence or absence of a cap of the container 40. The detector 20 may be, for example, a sensor for detecting reflection of applied light, a sensor for detecting transmission of applied light, or a camera for taking an image of the container 40. The detector 20 may be a line camera. The detector 20 may be a magnetic sensor, a contact sensor, a sensor for detecting eddy current, or an ultrasonic sensor.

The specimen measurement apparatus 100 includes a movement mechanism 30 for moving the container 40 relative to the detector 20. The movement mechanism 30 is implemented by, for example, a conveyor or a rotatable table, and may perform relative movement of the container 40. The movement mechanism 30 may include a linear motor and move the container 40 relative to the detector 20. The movement mechanism 30 may move the container 40 relative to the detector 20 which is stationary, or may move the detector 20 relative to the container 40 which is stationary. The movement mechanism 30 may move both the container 40 and the detector 20. The movement mechanism 30 may move the container 40 while being stored in a rack.

In the present embodiment, the detector 20 detects the container 40 which is being moved relative thereto by the movement mechanism 30. That is, the detector 20 detects the container 40 without temporarily stopping movement of the container 40 relative thereto.

In the present embodiment, since the specimen measurement apparatus 100 has the above-described configuration, movement of the container 40 relative to the detector 20 need not be temporarily stopped when detection of the container 40 is performed. Therefore, a period of time during which at least one of the disposition and the structure of the container 40 is detected can be shortened as compared with a case where at least one of the disposition and the structure thereof is detected by temporarily stopping the relative movement of the container 40. This can inhibit an operation for detecting the state of the container 40 from interfering with shortening of a specimen measurement time.

(Specimen Measurement Method)

Next, a specimen measurement method according to the present embodiment will be described.

In the specimen measurement method according to the present embodiment, at least one of the disposition and the structure of the container 40 which can store a specimen is detected while the specimen is being moved relative to the detector 20, and at least one of the disposition and the structure of the container 40 is specified based on a result of detection by the detector 20, to measure the specimen.

In the specimen measurement method according to the present embodiment, when detection of the container 40 is performed, movement of the container 40 relative to the detector 20 need not be temporarily stopped due to the above-described configuration. Therefore, a period of time during which at least one of the disposition and the structure of the container 40 is detected can be shortened as compared with a case where at least one of the disposition and the structure thereof is detected by temporarily stopping the relative movement of the container 40. This can inhibit an operation for detecting the state of the container 40 from interfering with shortening of a specimen measurement time.

(Configuration of Specimen Measurement Apparatus)

Figure 2:
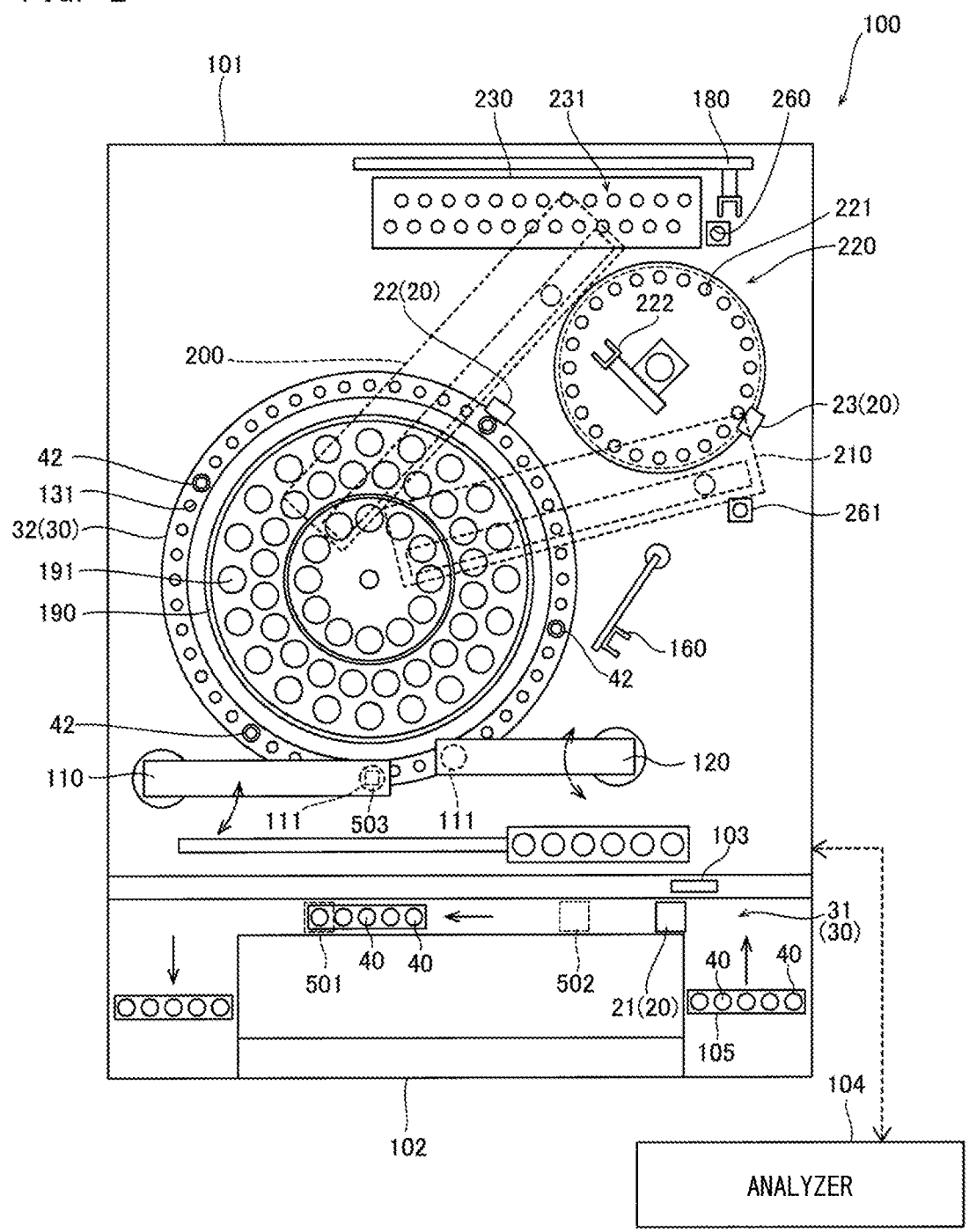
FIG. 2 is a plan view schematically illustrating an example of the entire configuration of the specimen measurement apparatus.

An example of the configuration of the specimen measurement apparatus 100 shown in FIG. 1 will be more specifically described with reference to FIG. 2. FIG. 2 shows an automatic measurement apparatus for blood coagulation analysis as an example of the specimen measurement apparatus 100.

(Blood Coagulation Measurement)

For example, in FIG. 2, in the specimen measurement apparatus 100, a light transmitter applies light to a measurement sample prepared by adding a reagent to a specimen, and a light receiver detects transmitted light or scattered light obtained from the light applied to the measurement sample. The specimen is plasma or serum separated from blood. The specimen measurement apparatus 100 analyzes the specimen by using a coagulation method, a synthetic substrate method, immunonephelometry, or an agglutination method. An analyzer 104 analyzes the specimen based on the detected light.

In the coagulation method, light is applied to a measurement sample, and a coagulation time in which fibrinogen in the specimen is converted into fibrin is measured based on an electrical signal of the transmitted light or scattered light obtained from the sample. Examples of the measurement item in the coagulation method include PT (prothrombin time), APTT (activated partial thromboplastin time), and Fbg (amount of fibrinogen).

In the synthetic substrate method, light is applied to a measurement sample, and a degree of coloring due to action of a chromogenic synthetic substrate on an enzyme in the measurement sample is measured based on an electrical signal of the transmitted light obtained from the sample. Examples of the measurement item in the synthetic substrate method include ATIII (antithrombin III), α2-PI (α2-plasmin inhibitor), and PLG (plasminogen).

In immunonephelometry, a reagent that causes antigen-antibody reaction in a coagulation fibrinolysis factor or the like in a specimen is added to the specimen, and a substance contained in the reagent agglutinates as a result of the antigen-antibody reaction. In immunonephelometry, light is applied to a measurement sample, and an agglutination speed of the substance contained in the reagent in the measurement sample is measured based on an electrical signal of transmitted light or scattered light obtained from the sample. Examples of the measurement item in immunonephelometry include D-dimer and FDP (fibrin degradation product).

In the agglutination method, light is applied to a measurement sample, and change of an absorbance during agglutination reaction of platelets or the like in the measurement sample is measured based on an electrical signal of transmitted light obtained from the sample. Examples of the measurement item in the agglutination method include vWF: RCo (von Willebrand ristocetin cofactor) and platelet aggregability.

(Immunoassay)

Furthermore, for example, the specimen measurement apparatus 100 may be an automatic measurement apparatus for immunoassay. The specimen measurement apparatus 100 uses antigen-antibody reaction between a target component in blood and a component in a reagent to detect the target component. As the target component, for example, an antigen or an antibody, protein, peptide, or the like that is contained in blood is detected. Serum or plasma is obtained as the specimen, and the immunoassay apparatus quantitatively or qualitatively measures, for example, an antigen or antibody contained in the specimen. The antigen-antibody reaction includes, in addition to a reaction between an antigen and an antibody, reaction using a specifically binding substance such as an aptamer. The aptamer is a nucleic acid molecule or peptide that is obtained by synthesis so as to specifically bind to a specific substance.

The specimen measurement apparatus 100 measures light generated from the sample, that is, chemiluminescence based on a test substance contained in the specimen. The specimen measurement apparatus 100 generates measurement data based on the light measured by the measurement unit.

In the description herein, the chemiluminescence is light generated by using energy caused by a chemical reaction. The chemiluminescence is, for example, light that is emitted when molecules excited into an excited state by chemical reaction are returned from the excited state to a ground state. The chemiluminescence measured by the measurement unit is based on, for example, chemiluminescent enzyme immunoassay (CLEIA), and is light generated by a reaction between an enzyme and a substrate.

In the chemiluminescent enzyme immuno-measurement method, for example, the 2-STEP method is used in which (1) a test substance in the specimen is carried by a solid support in a reaction container, (2) primary BF separation for separating the solid phase that carries the test substance, and a liquid phase from each other is then performed, (3) the solid phase that carries the test substance in the reaction container is bound to a labelling substance, (4) secondary BF separation is performed, and (5) a chemiluminescent substrate is added into the reaction container to cause enzymatic reaction. The chemiluminescent enzyme immuno-measurement method includes a known 1-STEP method, a D-1-STEP method (Delayed 1-STEP method), and the like as well as the 2-STEP method. Examples of the measurement item in the 2-STEP method include HBsAg. Examples of the measurement item in the 1-STEP method include HBsAb. Examples of the measurement item in the D-1-STEP method include FT3, FT4, and TSH.

The chemiluminescence measured by the measurement unit may be, for example, light based on chemiluminescent Immunoassay (CLIA), electrochemiluminescence immunoassay (ECLIA), fluorescence enzyme immunoassay (FEIA method), luminescent oxygen channeling immunoassay (LOCI method), bioluminescent enzyme immunoassay (BLEIA method), or the like.

(Blood Cell Analysis)

For example, the specimen measurement apparatus 100 may be an automatic measurement apparatus for measuring and analyzing a blood cell. The specimen measurement apparatus 100 causes a measurement sample prepared by mixing a blood specimen and a reagent to flow in a flow path, detects a component of a blood cell that flows in the flow path, and performs counting. The measurement section in a unit for blood cell analysis performs the measurement by, for example, a flow cytometry method. That is, the measurement section includes a flow path portion that allows a sample to flow therethrough, a light transmitter that applies measurement light to the sample flowing in the flow path portion, and a light receiver that detects the light applied to the sample.

The measurement section causes a particle such as a cell to flow in the flow of sheath liquid which is formed in the flow path portion, causes the light transmitter to apply laser light to the flowing particle, and causes the light receiver to detect scattered light and fluorescence. The specimen measurement apparatus 100 analyzes individual particles based on the light measured by the measurement section. For example, a scattergram is generated by using, as parameters, an intensity of the scattered light and an intensity of the fluorescence in combination, and the sample is analyzed based on the distribution in the scattergram, and the like. Examples of the measurement item in the flow cytometry method include NEUT (neutrophil), LYMPH (lymphocyte), MONO (monocyte), EO (eosinophil), and BASO (basophil).

Furthermore, the specimen measurement apparatus 100 performs, for example, measurement according to the sheath flow DC detection method. That is, the measurement section includes a flow path portion having an aperture through which a sample flows, and a detector that detects electrical change between paired electrodes (not shown) that are arranged so as to oppose each other across the aperture. The measurement section causes a particle such as a cell to flow in the flow of sheath liquid that passes through the aperture, and causes a direct current to flow between the electrodes. The measurement section detects individual particles based on pulsed current change in the case of each particle passing through the aperture. Examples of the measurement item in the sheath flow DC detection method include the number of WBCs (white blood cells), the number of RBCs (red blood cells), HGB (amount of hemoglobin), HCT (hematocrit value), MCV (mean corpuscular volume), MCH (mean corpuscular hemoglobin), MCHC (mean corpuscular hemoglobin concentration), and PLT (the number of platelets).

(Overall Configuration)

In the example of the configuration shown in FIG. 2, the specimen measurement apparatus 100 includes the measurement unit 101, a transport unit 102, and the analyzer 104. The specimen measurement apparatus 100 includes detectors 21, 22, and 23 as the detector 20. The specimen measurement apparatus 100 includes a movement mechanism 31 and rotatable tables 32 and 33 as the movement mechanism 30.

In the example of the configuration shown in FIG. 2, the specimen measurement apparatus 100 has a function of suctioning a specimen from the container 40 that contains the specimen and quantitatively dispensing the specimen into a container 42.

In the transport unit 102, a specimen rack 105 is disposed. In the specimen rack 105, a plurality of the containers 40 each of which contains a specimen can be disposed. The transport unit 102 transports the specimen rack 105 which has been set by a user, and locates each container 40 at a predetermined specimen suctioning position 501 or 502. To each of the specimen rack 105 and the container 40, a label (not shown) in which identification information is recorded in a barcode or the like is adhered. The identification information of the specimen rack 105 and the container 40 is read by a reader 103 disposed in a transport route, and is transmitted to the analyzer 104. The specimen in the container 40 and the measurement result of the specimen are managed so as to be associated with each other according to the identification information.

The transport unit 102 has the movement mechanism 31 for moving the container 40 relative to the detector 21. The detector 21 performs detection of the container 40 which is being moved relative thereto by the movement mechanism 31.

The movement mechanism 31 linearly transports the containers 40, and transports the containers 40 in a state where the containers 40 are stored in the specimen rack 105 that can store a plurality of the containers 40. Thus, the detector 21 can perform the detection while the plurality of the containers 40 are being linearly moved in a state where the plurality of the containers 40 are stored in the specimen rack 105. Therefore, the plurality of the containers 40 can be detected while being moved. As a result, a detection time can be effectively shortened as compared with a case where detection is performed by temporarily stopping each of the plurality of the containers 40.

The movement mechanism 31 moves the container 40 relative to the detector 21 which is stationary when the detector 21 performs the detection. Thus, at least one of the disposition and the structure of the container 40 can be detected without temporarily stopping the container 40 relative to the detector 21.

The detector 21 continuously performs sensing also at a time other than the time of detection for the container 40. Thus, control for frequently switching the sensing of the detector 21 between on and off, need not be performed. Accordingly, a load for controlling the detection for the container 40 can be inhibited from increasing.

The measurement unit 101 includes specimen dispensers 110 and 120 for suctioning a specimen in the container 40 and quantitatively dispensing the specimen into the container 42.

The specimen dispensers 110 and 120 are each configured as a dispensing arm that holds a specimen dispensing pipette 111 such that the pipette 111 is pivotable. Each pipette 111 is connected to a not-illustrated pump, and can quantitatively suction and discharge the specimen. The specimen dispenser 110 can move the pipette 111 and suction a predetermined amount of specimen from the container 40 at the specimen suctioning position 501. The specimen dispenser 120 can move the pipette 111 and suction a predetermined amount of specimen from the container 40 at the specimen suctioning position 502. Each of the specimen dispensers 110 and 120 can move the pipette 111 and discharge the suctioned specimen into the container 42 disposed at a predetermined specimen dispensing position. Each of the specimen dispensers 110 and 120 changes a suctioning method according to whether or not the container 40 from which the specimen is suctioned has a cap 41 attached thereto, and suctions the specimen. When the container 40 has the cap 41 attached thereto, each of the specimen dispensers 110 and 120 inserts the pipette 111 into the cap 41 so as to press the container 40 from thereabove. When the container 40 does not have the cap 41 attached thereto, each of the specimen dispensers 110 and 120 moves the pipette 111 downward toward the container 40 without pressing the container 40. When the container 40 has the cap 41 attached thereto, the specimen may be suctioned after the cap 41 is opened.

The measurement unit 101 optically measures a measurement sample prepared by adding a predetermined reagent to the specimen suctioned by the specimen dispenser 110.

The measurement unit 101 includes a mechanism for transferring, to each section, the container 42 in which a specimen and a reagent are stored to prepare a measurement sample. In the example of the configuration shown in FIG. 2, the measurement unit 101 includes the rotatable table 32 for transporting the container 42. The rotatable table 32 has a ring-like shape in a planar view, and can rotate in the circumferential direction. The rotatable table 32 has a plurality of holding holes 131 arranged along the circumferential direction. One container 42 can be disposed in each holding hole 131. The specimen dispenser 110 can dispense the suctioned specimen into a new container 42 held by the rotatable table 32 at a specimen dispensing position 503. The specimen dispenser 120 can also suction a specimen from the container 42, in the rotatable table 32, for storing a specimen.

That is, the movement mechanism 30 includes the rotatable tables 32 and 33, and transports the containers 42 disposed in the rotatable tables 32 and 33, by rotating the rotatable tables 32 and 33. Thus, the containers 42 disposed in the rotatable tables 32 and 33 can be detected without temporarily stopping the rotation of the rotatable tables 32 and 33.

A lot of new containers 42 are stored in a container storage unit (not shown), and are taken out from the container storage unit one by one. The container 42 taken out from the container storage unit can be disposed in the holding hole 131 of the rotatable table 32.

The detector 22 can detect presence or absence of the container 42 disposed in the rotatable table 32. The detector 22 is used for confirming that the container 42 has been placed in the rotatable table 32. The detector 22 is used also for confirming that the container 42 has been taken out from the rotatable table 32. The detector 22 is used also for confirming that the container 42 is not disposed in the rotatable table 32 in an initial operation.

In the example of the configuration shown in FIG. 2, the specimen measurement apparatus 100 has a function of adding a reagent to a specimen in the container 42 to prepare a measurement sample. The measurement sample is a mixture of the specimen and the reagent.

The measurement unit 101 has a holding mechanism 160 capable of transporting the container 42. The holding mechanism 160 can hold and transfer the container 42, and locate the container 42 in the holding hole 131 or take out the container 42 from the holding hole 131. The holding mechanism 160 can transfer the held container 42 into a disposal outlet 261.

The measurement unit 101 includes a reagent table 190 for storing a reagent container 191 used for measurement, and reagent dispensers 200 and 210 each of which suctions and discharges a reagent from the reagent container disposed in the reagent table 190.

The reagent table 190 is disposed on the inner side of the rotatable table 32, and has a circular shape in a planar view. A plurality of the reagent containers 191 can be disposed in the reagent table 190 along the circumferential direction. The reagent table 190 is rotatable in the circumferential direction, and can allow any of the reagent containers 191 to be located at a predetermined reagent suctioning position by the rotation.

The reagent dispensers 200 and 210 each include a reagent dispensing pipette (not shown). The pipette is connected to a not-illustrated pump, and can quantitatively suction and discharge the reagent. The reagent dispenser 200 can suction a predetermined amount of reagent from the reagent container 191 positioned at the predetermined reagent suctioning position on the reagent table 190. The reagent dispenser 200 can move the pipette to a reagent dispensing position and discharge the predetermined amount of reagent into the container 42 disposed at the reagent dispensing position.

The reagent dispenser 210 can suction a predetermined amount of reagent from the reagent container 191 disposed at the predetermined reagent suctioning position on the reagent table 190. The reagent dispenser 210 can move the pipette to a reagent dispensing position and discharge the predetermined amount of reagent into the container 42 at the reagent dispensing position.

The measurement unit 101 includes the rotatable table 33 for holding and heating the container 42 into which the specimen has been dispensed. The rotatable table 33 includes a plurality of holding holes 221 for holding a plurality of the containers 42, respectively, each of which contains the specimen, and a holding mechanism 222 for holding and transferring the container 42. The rotatable table 33 has a heater (not shown) incorporated therein for heating the containers 42 held in the plurality of the holding holes 221, respectively.

The rotatable table 33 has a circular shape in a planar view, and has the plurality of holding holes 221 arranged along the circumferential direction. The rotatable table 33 is rotatable in the circumferential direction, and can transfer the containers 42 disposed in the plurality of the holding holes 221 in the circumferential direction by rotation while heating the containers 42 to a predetermined temperature by the heater. The holding mechanism 222 can hold and transfer the container 42, and locate the container 42 in the holding hole 221 or take out the container 42 from the holding hole 221.

The detector 23 can detect presence or absence of the container 42 disposed in the rotatable table 33. The detector 23 is used for confirming that the container 42 has been placed in the rotatable table 33. The detector 23 is used also for confirming that the container 42 has been taken out from the rotatable table 33. The detector 23 is used also for confirming that the container 42 is not disposed in the rotatable table 33 in an initial operation.

The specimen measurement apparatus 100 may be configured to perform measurement for the container 42 in which a prepared measurement sample has been stored in advance, without having the reagent table 190, the reagent dispenser 200, and the rotatable table 33.

The measurement unit 101 includes a detection unit 230 for optically measuring a measurement sample in the container 42. The detection unit 230 includes container setting portions 231 in which the containers 42 each containing a specimen are set, and light receivers that are disposed so as to correspond to the container setting portions 231.

In the example of the configuration shown in FIG. 2, the detection unit 230 includes a plurality of the container setting portions 231. In the detection unit 230, the plurality of container setting portions 231 are linearly aligned at predetermined intervals in two rows.

The measurement unit 101 includes a holding mechanism 180 for transferring the container 42 to the detection unit 230.

The holding mechanism 180 includes a movement mechanism (not shown) for movement in each of X, Y, and Z directions that are three orthogonal axial directions, and can hold and transfer the container 42. The holding mechanism 180 can take out the container 42 from the holding hole 221 of the rotatable table 33, transfer the container 42 to the reagent dispensing position, and set the container 42 into which the reagent has been dispensed, in the container setting portion 231 of the detection unit 230. The holding mechanism 180 can take out the container 42 having been measured from the container setting portion 231, and transfer the container 42 into a disposal outlet 260.

The measurement sample in the container 42 which is set in the container setting portion 231 of the detection unit 230 is optically measured. A light applying unit applies light for measurement to the container 42 which is set in the container setting portion 231 of the detection unit 230. The light receiver receives transmitted light or scattered light obtained from the light applied to the container 42, and outputs an electrical signal corresponding to an amount of received light. The electrical signal is transmitted to the analyzer 104. The analyzer 104 analyzes the specimen based on the electrical signal outputted from the light receiver.

(Control Device)

Figure 3:
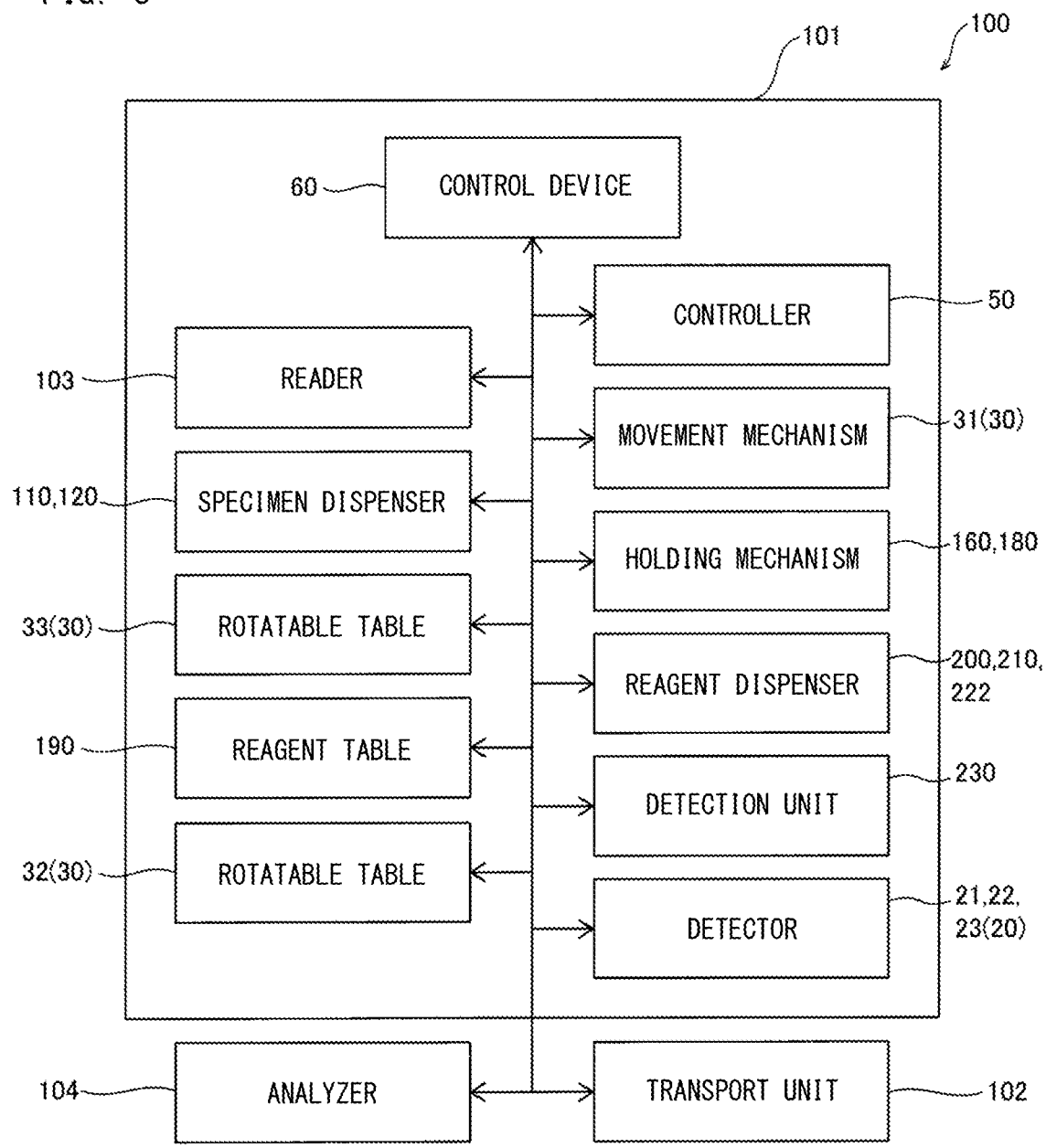
FIG. 3 is a block diagram illustrating a configuration for control for the specimen measurement apparatus.

As shown in FIG. 3, the specimen measurement apparatus 100 includes a control device 60 for controlling an operation of the measurement unit 101. The control device 60 controls an operation of each unit of the specimen measurement apparatus 100. The control device 60 includes an arithmetic processing unit such as a CPU (central processing unit), and controls each section in the measurement unit 101 and the transport unit 102 according to a program stored in a storage unit. The storage unit includes a storage medium such as a ROM (read only memory), a RAM (random access memory), and a hard disk, and stores programs and data necessary for an operation of the control device 60.

Figure 4:
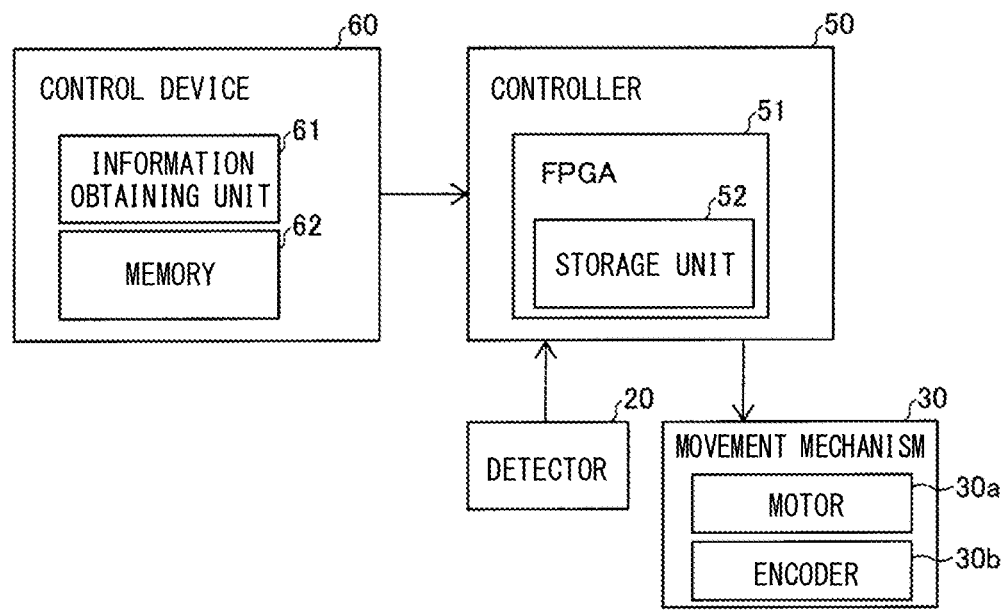
FIG. 4 is a block diagram illustrating a control unit of the specimen measurement apparatus.

As shown in FIG. 4, the control device 60 includes an information obtaining unit 61 and a memory 62. The information obtaining unit 61 may be configured by, for example, software controlled by the program. The memory 62 includes a storage medium such as a ROM (read only memory), a RAM (random access memory), and a hard disk. The control device 60 controls a controller 50 for controlling the movement mechanism 30. The controller 50 includes, for example, a hardware configuration such as a FPGA (field-programmable gate array) 51. The FPGA 51 has a storage unit 52 for storing information.

The movement mechanism 30 includes a motor 30a and an encoder 30b. The controller 50 operates to drive the motor 30a while an amount of drive or a drive position by the encoder 30b is detected. The detector 20 detects the container 40 or 42 which is being moved relative thereto, based on an amount of drive or a drive position, for the motor 30a, which is obtained by the encoder 30b. Thus, a moving distance or a movement position by the movement mechanism 30 can be easily obtained.

Specifically, while the controller 50 causes the movement mechanism 30 to move the container 40 or 42 relative to the detector 20, the controller 50 causes the storage unit 52 to store a detection result from the detector 20 at a predetermined relative position. Thus, the controller 50 can control relative movement for detecting the container 40 or 42, and can operate to store the detection result.

The information obtaining unit 61 can obtain information. The information obtaining unit 61 obtains at least one of information about the disposition of the container 40 or 42 and information about the structure of the container 40 or 42, based on the detection result, from the detector 20, which is stored by the controller 50. Thus, the controller 50, which causes the detection result to be stored, need not analyze the detection result of at least one of the disposition and the structure of the container 40 or 42 to obtain the detection result as information. Therefore, increase of processing load for detection can be inhibited.

The information obtaining unit 61 can perform association of information. The detector 20 obtains first information about at least one of presence or absence of the container 40 or 42 and presence or absence of the cap 41 of the container 40. The storage unit 52 stores second information about at least one of a time when the first information is obtained, and a position of the container 40 or 42 relative to the detector 20 at the time. The information obtaining unit 61 associates, based on the second information, the first information with third information about at least one of identification of the container 40 or 42 and the position of the container 40 or 42 on the movement mechanism 30. Thus, after the detector 20 has performed the detection, the information obtaining unit 61 can perform analysis by associating the information. Therefore, increase of processing load for detection can be inhibited.

The FPGA 51 determines whether or not the container 40 or 42 is on the movement mechanism 30, and whether the cap 41 is present or absent, at a high speed, without stopping relative movement of the container 40 or 42. Specifically, the FPGA 51 determines whether the container 40 or 42 is present or absent during the relative movement, and transmits the result being latched, to a higher-order section. The FPGA 51 obtains relationship between the container position and presence or absence of the container 40 or 42, from a pulse value of the motor 30a or from the encoder 30b, to latch the result.

The FPGA 51 operates at, for example, an operation clock of 20 MHz. The container position is set to the monitoring start location position+the first position location+the container interval×n, and the FPGA 51 operates. The presence or absence of the container is determined only when the detector 20 has passed through the container position. The FPGA 51 changes the end flag from 0 to 1 when all the detections have been ended.

(Detector)

Figure 5:
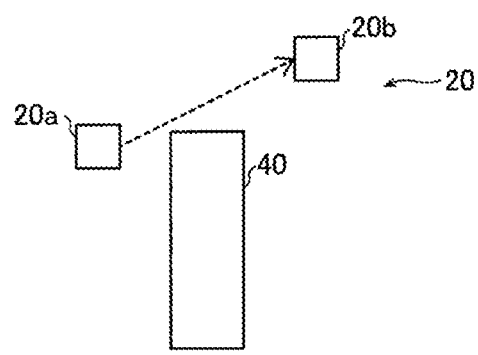
FIG. 5 is a first diagram illustrating an example of a configuration of a detector of the specimen measurement apparatus.
Figure 6:
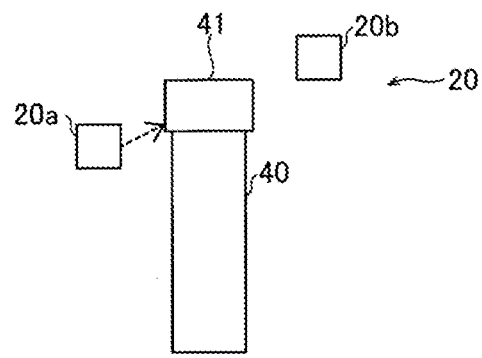
FIG. 6 is a second diagram illustrating an example of the configuration of the detector of the specimen measurement apparatus.

As shown in FIG. 5 and FIG. 6, the detector 20 (21) detects presence or absence of the cap 41 of the container 40. The detector 20 includes a light emitter 20a and a light receiver 20b. The detector 20 applies visible light or infrared light from the light emitter 20a toward the light receiver 20b. The light emitter 20a and the light receiver 20b are arranged at different height positions in the up-down direction. That is, the light emitter 20a applies light toward the light receiver 20b in the diagonal direction. In the detector 20, when the container 40 does not have the cap 41 attached thereto, light from the light emitter 20a reaches the light receiver 20b as shown in FIG. 5. The detector 20 detects that the cap 41 is absent when the light receiver 20b detects the light. In the detector 20, when the container 40 has the cap 41 attached thereto, the light from the light emitter 20a is blocked by the cap 41 and the light does not reach the light receiver 20b, as shown in FIG. 6. The detector 20 detects that the cap 41 is present when the light receiver 20b does not detect the light. The positions of the light emitter 20a and the light receiver 20b in the detector 20 may be adjusted according to the sizes and kinds of the container 40 and the cap 41 to be used.

Figure 7:
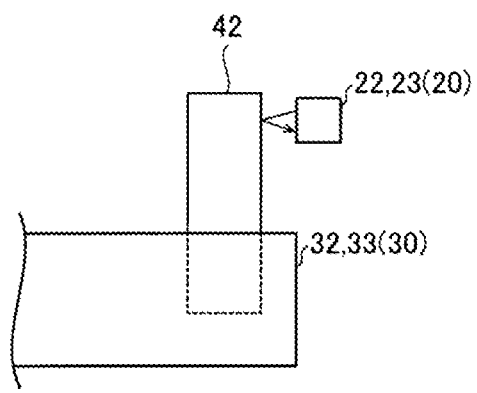
FIG. 7 is a third diagram illustrating an example of the configuration of the detector of the specimen measurement apparatus.

As shown in FIG. 7, the detector 20 (22 and 23) detects the disposition of the container 42 by detecting the presence of the container 42. The detectors 22 and 23 are disposed near the rotatable tables 32 and 33, respectively. The detectors 22 and 23 are reflection-type sensors. The detectors 22 and 23 detect reflected light when the container 42 is present. The detectors 22 and 23 do not detect reflected light when the container 42 is absent. The detectors 22 and 23 may use analog-type sensors.

Figure 8:
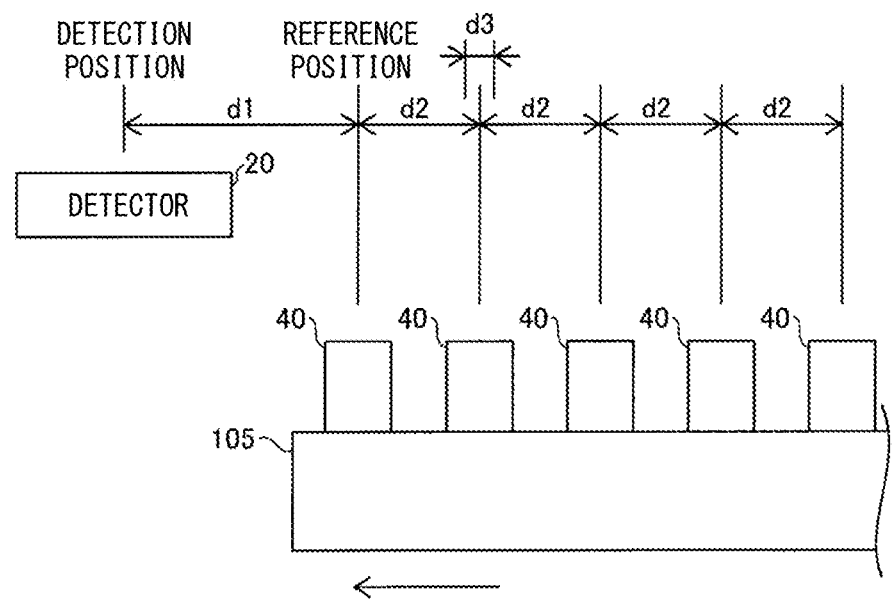
FIG. 8 illustrates a detection process by a controller of the specimen measurement apparatus.

As shown in FIG. 8, the detector 20 performs detection of the container 40 or 42 which is being moved relative thereto, based on a moving distance or a movement position by the movement mechanism 30. Thus, the detector 20 can perform the detection at timing when the container 40 or 42 is at a relative position at which the detector 20 can detect the container 40 or 42. Therefore, at least one of the disposition and the structure of the container 40 or 42 can be easily detected without temporarily stopping relative movement of the container 40 or 42.

Specifically, a reference position at which the relative position of the container 40 or 42 relative to the detector 20 is known is set in a section where the container 40 or 42 is moved by the movement mechanism 30. The movement mechanism 30 moves the container 40 or 42 from the reference position that is set as the start point. Thus, the detector 20 performs the detection at timing when the container 40 or 42 has been moved over a predetermined distance d1 from the reference position to the position at which the detector 20 performs the detection, whereby the detector 20 can assuredly detect the container 40 or 42 also while the container 40 or 42 is being moved. After the container 40 or 42 has been moved over the distance d1, the detector 20 performs the detection each time relative movement of the container 40 or 42 over an interval d2 for disposing the containers 40 or 42 is performed. The detection is performed while the position at which the container 40 or 42 is disposed relative to the detector 20, is moved over a monitor width d3.

The controller 50 causes the FPGA 51 to latch and store a detection signal from the detector 20 each time the position at which the container 40 or 42 is disposed reaches the detection position.

Figure 9:
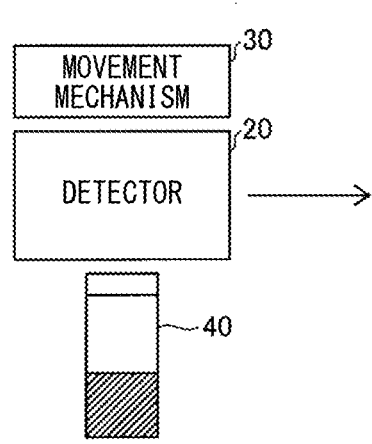
FIG. 9 illustrates a first example of the movement mechanism of the specimen measurement apparatus.

As shown in FIG. 9, the movement mechanism 30 may move the detector 20 relative to the container 40 or 42 which is stationary, when the detector 20 performs the detection. Thus, at least one of the disposition and the structure of the container 40 or 42 can be detected without temporarily stopping the detector 20 relative to the container 40 or 42.

In this case, an initial position of the detector 20 is set, and the movement mechanism 30 moves the detector 20 from the initial position that is set as the start point. Thus, the detector 20 performs the detection at timing when the detector 20 has been moved over a predetermined distance from the initial position to the position of the container 40 or 42, whereby detection for the container 40 or 42 can be assuredly performed while the detector 20 is being moved.

Figure 10:
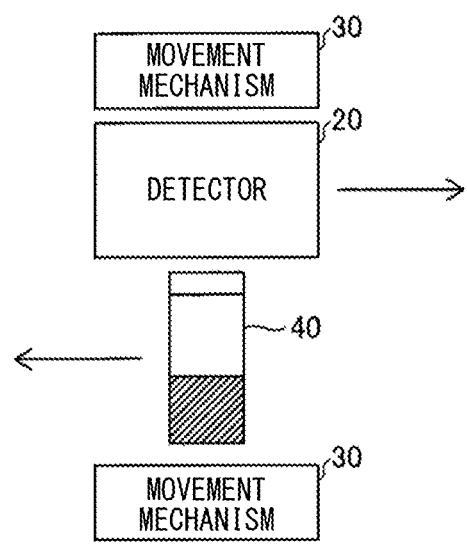
FIG. 10 illustrates a second example of the movement mechanism of the specimen measurement apparatus.

As shown in FIG. 10, the movement mechanism 30 may move both the detector 20 and the container 40 or 42 when the detector 20 performs the detection.

(Cap Detection Process)

Figure 11:
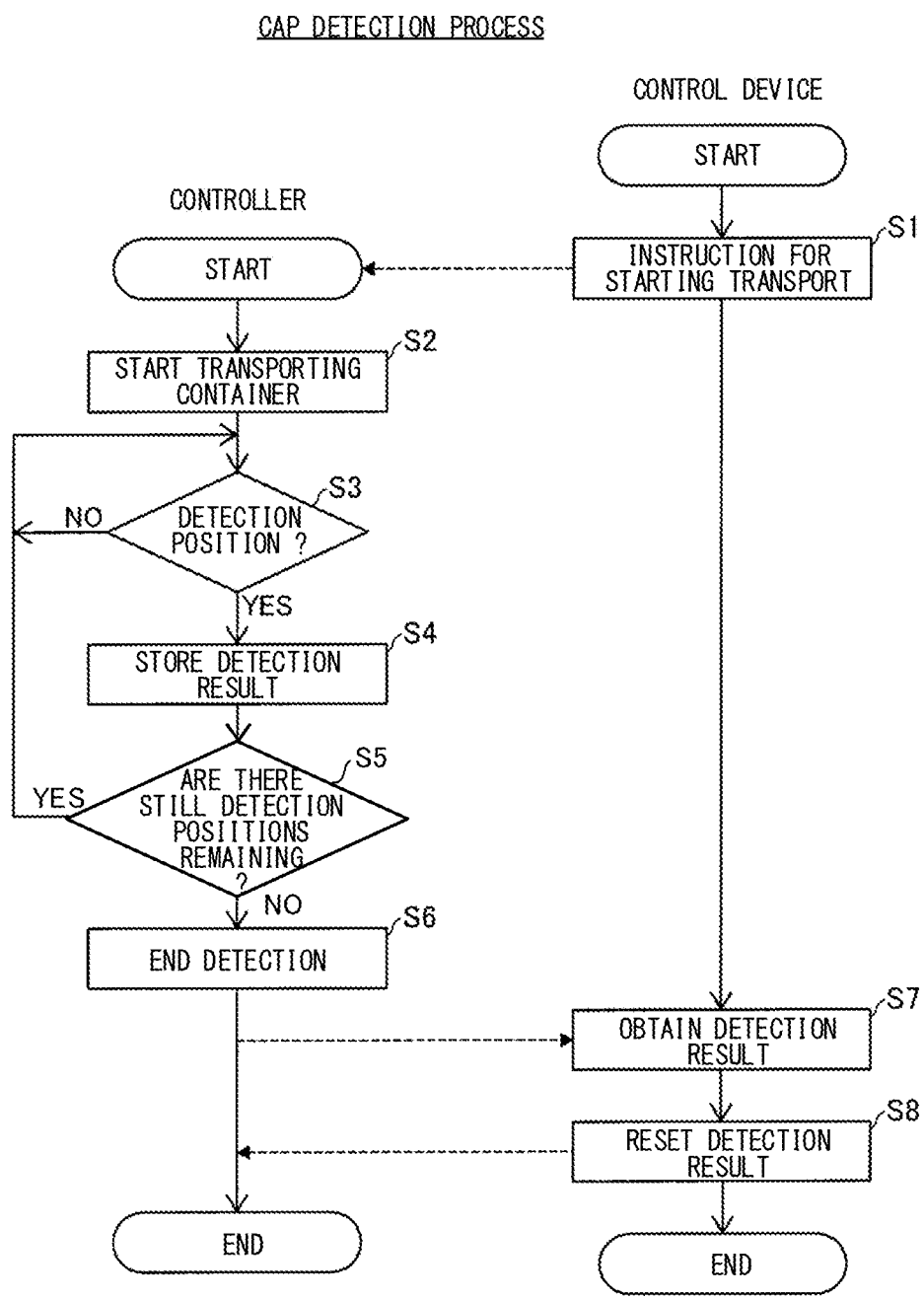
FIG. 11 is a flow chart showing a cap detection process performed by the specimen measurement apparatus.

A cap detection process by the controller 50 will be described with reference to FIG. 11.

Based on a transport start instruction from the control device 60 in step S1, the controller 50 causes the movement mechanism 30 to start transporting the container 40 in step S2.

In step S3, the controller 50 determines whether or not the position of transport by the movement mechanism 30 is the detection position, based a signal from the encoder 30b. When the position of the transport is not the detection position, the controller 50 repeats the determination of step S3 until the position of the transport reaches the detection position. When the position of the transport is the detection position, the process proceeds to step S4. In step S4, the controller 50 operates to store the detection result from the detector 20.

In step S5, the controller 50 determines whether or not there are still detection positions remaining. When there are still detection positions remaining, the process is returned to step S3. When there is no detection position remaining, the process proceeds to step S6. In step S6, the controller 50 operates to end the detection. The controller 50 operates to stop transporting the container 40.

When the detection by the detector 20 has been ended, the control device 60 obtains the detection result stored by the controller 50 at any timing in step S7. When all the detection results have been obtained from the controller 50, the control device 60 operates to reset the detection result in step S8. Thus, the subsequent detection can be performed.

(Container Detection Process)

Figure 12:
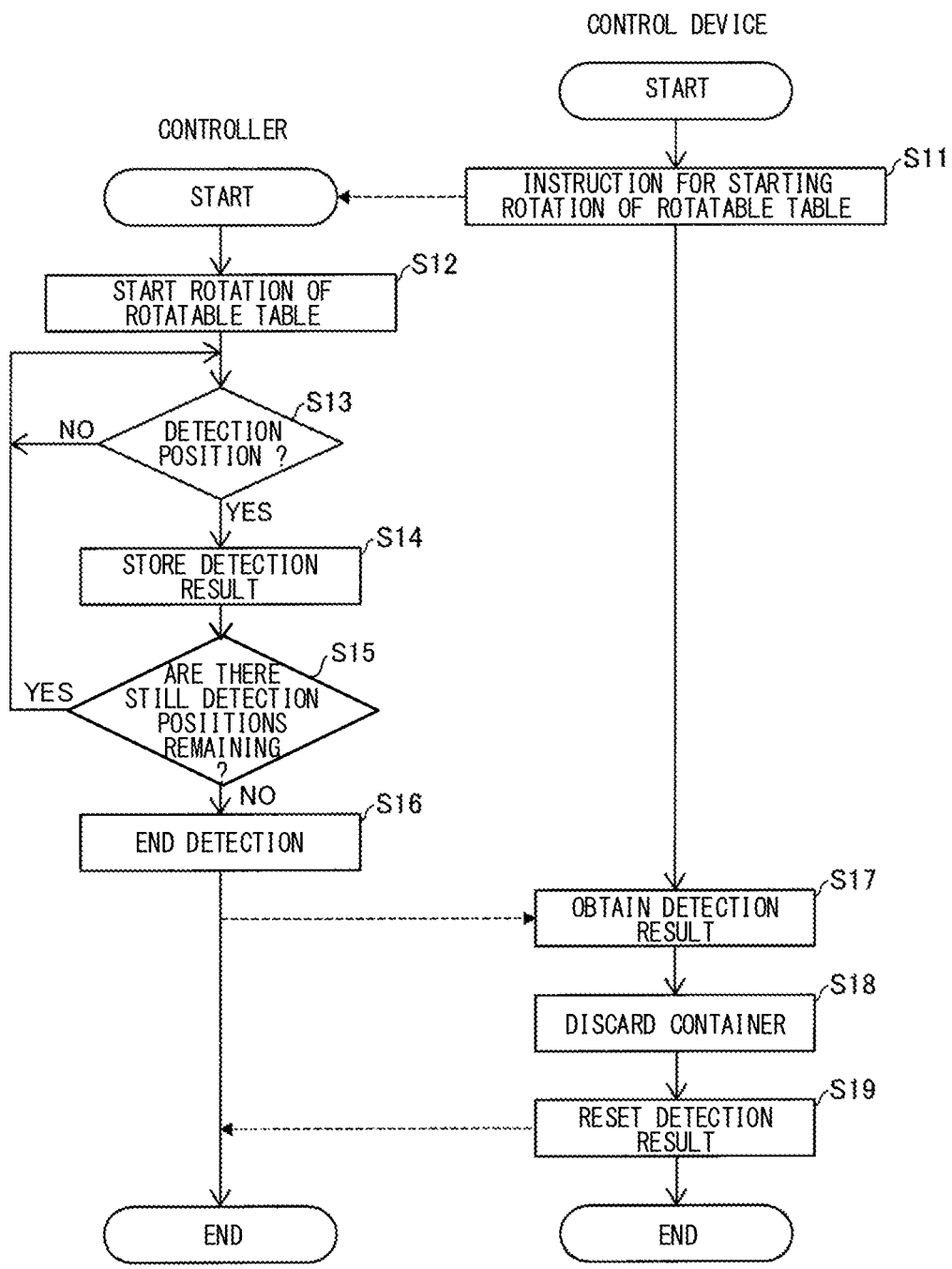
FIG. 12 is a flow chart showing a container detection process performed by the specimen measurement apparatus.
Figure 13:
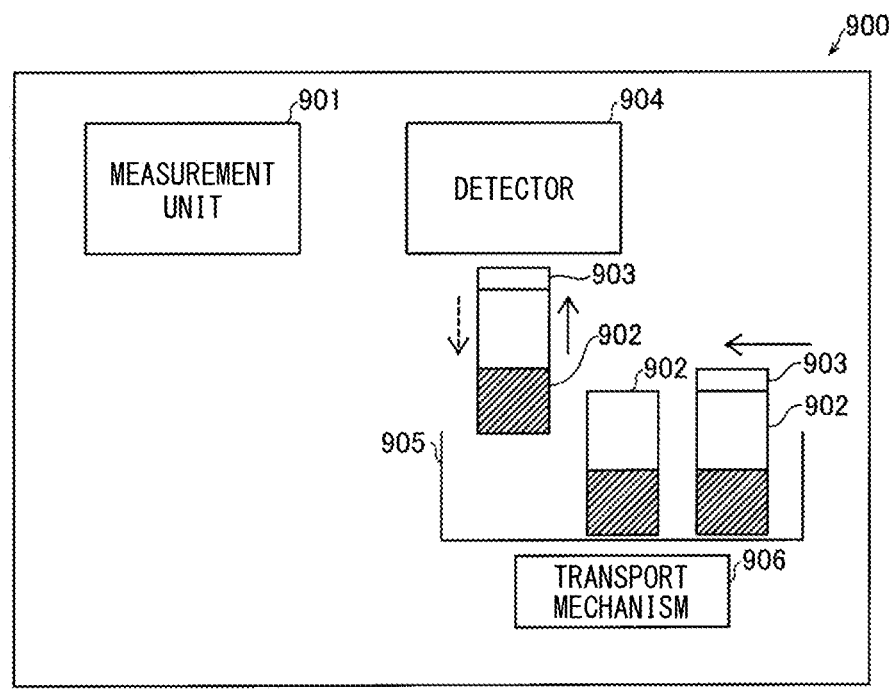
FIG. 13 illustrates a conventional art.

A container detection process by the controller 50 will be described with reference to FIG. 12.

The container detection process is performed in order to detect that the container 42 is not disposed in the rotatable tables 32 and 33, in the initial operation of the specimen measurement apparatus 100. Based on an instruction from the control device 60 for starting rotation of the rotatable table in step S11, the controller 50 causes the rotatable table 32 or 33 to start rotating in step S12. The controller 50 causes the rotatable table 32 or 33 to perform, for example, one rotation for a few seconds.

In step S13, the controller 50 determines whether or not the position of the rotation of the rotatable table 32 or 33 is the detection position, based on a signal from the encoder 30b. When the position of the rotation is not the detection position, the controller 50 repeats the determination of step S13 until the position of the rotation reaches the detection position. When the position of the rotation is the detection position, the process proceeds to step S14. In step S14, the controller 50 operates to store the detection result from the detector 20.

In step S15, the controller 50 determines whether or not there are still detection positions remaining. That is, the controller 50 determines whether or not the rotatable table 32 or 33 has performed one rotation. When there are still detection positions remaining, the process is returned to step S13. When there is no detection position remaining, the process proceeds to step S16. In step S16, the controller 50 operates to stop the rotation of the rotatable table 32 or 33, and ends the detection.

When the detection by the detector 20 has been ended, the control device 60 obtains the detection result stored by the controller 50 at any timing in step S17. When the container 42 is in the rotatable table 32 or 33, the control device 60 operates to discard the container 42 disposed in the rotatable table 32 or 33 in Step S18. When all the detection results have been obtained from the controller 50, the control device 60 operates to reset the detection result in step S19. Thus, the subsequent detection can be performed.

The embodiment disclosed herein is merely illustrative in all aspects and should not be construed as being restrictive. The scope of the present invention is defined not by the description of the above embodiment but by the scope of the claims, and is intended to include meaning equivalent to the scope of the claims and all modifications within the scope.

What is claimed is:

1. A specimen measurement apparatus comprising:
a measurement unit configured to measure a specimen;
a detector configured to detect a container that can store the specimen; and
a movement mechanism comprising a first movement assembly, a motor, and an encoder,
the first movement assembly comprising
a rotatable table which comprises holders thereon each configured to hold a respective container, the motor being configured to rotate the rotatable table,
the encoder being configured to output an amount of drive by the motor, and the movement mechanism being configured to move the container relative to the detector by rotating the rotatable table, and
a holding mechanism configured to discard the container held on the rotatable table from the rotatable table;
wherein
the detector configured to detect the container in a state where the movement mechanism keeps moving the container relative to the detector without stopping the relative movement of the container to the detector, the detector is configured to continuously perform sensing while the movement mechanism moves the container relative to the detector without temporarily stopping a relative movement between the container and the detector,
wherein
the specimen measurement apparatus further comprises a controller programmed to:
in response to the specimen measurement apparatus being started, confirm that no container is held on any of the holders in an initial operation of the specimen measurement apparatus by:
controlling the movement mechanism to rotate the rotatable table without stopping the rotation until all of the holders passing through the detector to detect whether at least one container is held on any of the holders by the detector in the initial operation of the specimen measurement apparatus,
while the rotatable table is rotating in the initial operation, determining whether or not a position of rotation by the movement mechanism is a detection position based on the amount of drive by the motor outputted from the encoder, the detection position represents a position where the detector is capable of detecting the container held on the holder, and storing a detection result, from the detector, of whether or not the container is present when the position of rotation is the detection position, and
in case that the container is present, in response to stopping the rotation of the rotatable table, performing an operation to control the holding mechanism to discard the container held on the rotatable table from the rotatable table.

2. The specimen measurement apparatus of claim 1, wherein the detector detects the container, based at least in part on a moving distance or a movement position by the movement mechanism.

3. The specimen measurement apparatus of claim 1, wherein the movement mechanism is configured to move the container to the detector while the detector performs detection.

4. The specimen measurement apparatus of claim 3, wherein
the detector detects the container, based at least in part on a moving distance of the container from a reference position.

5. The specimen measurement apparatus of claim 1, wherein the movement mechanism comprises a second movement assembly that is configured to move the detector to the container while the detector performs detection.

6. The specimen measurement apparatus of claim 5, wherein
the detector detects the container, based at least in part on a moving distance of the detector from an initial position of the detector.

7. The specimen measurement apparatus of claim 5, wherein the movement mechanism is configured to move both the container and the detector while the detector performs detection.

8. The specimen measurement apparatus of claim 1, wherein the rotatable table is configured to transport the container disposed in the rotatable table by rotating the rotatable table.

9. The specimen measurement apparatus of claim 1, wherein the first movement assembly of the movement mechanism rotates the rotatable table storing a plurality of containers, and
the detector is configured to detect each container stored in the rotatable table in a state where the movement mechanism is moving the rotatable table relative to the detector.

10. The specimen measurement apparatus of claim 1, wherein the movement mechanism is configured to transport the holders of the rotatable table, and the detector is configured to detect a presence of the container held by at least one of the holders.

11. The specimen measurement apparatus of claim 1, further comprising:
at least one processing device configured to obtain information on at least one of presence or absence of the container based on the detection result from the detector stored in the controller.

12. The specimen measurement apparatus of claim 1, wherein the movement mechanism is configured to transport the holders of the rotatable table, and
the specimen measurement apparatus further comprises at least one processing device configured to associate at least one of presence or absence of the container with each holder, based at least in part on at least one of time when at least one of the container, or a position of the container relative to the detector at the time of the detection.

13. The specimen measurement apparatus of claim 1, wherein the detector is configured to continuously perform the detection operation while the movement mechanism moves the container relative to the detector.

14. A method performed in a specimen measurement apparatus, comprising:
Providing the specimen measurement apparatus of claim 1;
moving the container that can store a specimen relative to the detector;
detecting, by the detector, at least one of the container or a cap of the container while moving the container relative to the detector.

15. The method of claim 14, wherein the moving the container comprises moving holders each configured to hold a container, and the detecting comprises detecting the container held by the holders or the cap of the container while moving the holders relative to the detector, wherein the method further comprises locating the holder wherein the container or the cap of the container is detected.

16. The method of claim 14, wherein the detecting comprises detecting the container or the cap of the container, based on a moving distance of the container from a reference position.

* * * * *